(12) United States Patent
Andrews et al.

(10) Patent No.: US 6,427,639 B1
(45) Date of Patent: Aug. 6, 2002

(54) METHOD AND APPARATUS FOR WARMING INTAKE AIR TO AN INTERNAL COMBUSTION ENGINE

(75) Inventors: Craig C. Andrews, College Station; Oliver J. Murphy, Bryan, both of TX (US)

(73) Assignee: Lynntech, Inc., College Station, TX (US)

( * ) Notice: Subject to any disclaimer, the term of this patent is extended or adjusted under 35 U.S.C. 154(b) by 0 days.

(21) Appl. No.: 09/206,828

(22) Filed: Dec. 7, 1998

Related U.S. Application Data

(63) Continuation-in-part of application No. 08/682,024, filed on Jul. 16, 1996, now Pat. No. 5,845,485.

(51) Int. Cl.[7] ............................................... F02M 27/00

(52) U.S. Cl. .......................................... 123/3; 123/539

(58) Field of Search .......................... 123/3, 539, 536, 123/556, 41.31, 670, DIG. 12, 585, 590

(56) References Cited

U.S. PATENT DOCUMENTS

| | | | |
|---|---|---|---|
| 3,311,097 A | | 3/1967 | Mittelstaedt |
| 3,420,052 A | | 1/1969 | Miller |
| 3,719,457 A | | 3/1973 | Nagamatsu |
| 3,729,936 A | | 5/1973 | DePalma |
| 3,761,229 A | | 9/1973 | Schwartz |
| 3,779,014 A | | 12/1973 | Nohira |
| 3,782,115 A | | 1/1974 | Johnson |
| 4,074,661 A | * | 2/1978 | Noguchi et al. ................ 123/3 |
| 4,212,273 A | * | 7/1980 | Maruoka ..................... 123/438 |

(List continued on next page.)

FOREIGN PATENT DOCUMENTS

| | | | |
|---|---|---|---|
| DE | 2 246 218 | 9/1972 | |
| DE | 4103668 | 2/1991 | |
| DE | 4103668 | 8/1992 | |
| DE | 4420715 | 1/1995 | |
| FR | 2.227.769 | 11/1974 | |
| FR | 2387357 | 4/1978 | |
| JP | 147856 | * 8/1984 | .......... F02M/31/06 |
| JP | 145558 | * 6/1991 | .......... F02M/27/02 |
| JP | 4-318214 | 9/1992 | |
| JP | A 4318214 | 9/1992 | |
| JP | A 6033748 | 8/1994 | |

OTHER PUBLICATIONS

Youji Kanada, Hydrogen Added After–Burner System, 960346, pp. 89–94.
Oliver J. Murphy, Method and Apparatus for Injecting Hydrgen into a Catalytic Converter, LYNN/0035.
International Search Report WO 94/03710, PCT/US93/06850.
Anthony John Appleby, PCT publication No. WO 96/11330, Apr. 18, 1996, Cover with 16 pages and drawings Fig. 1–Fig. 7.

*Primary Examiner*—Tony M. Argenbright
*Assistant Examiner*—Hai Huynh
(74) *Attorney, Agent, or Firm*—Streets & Steele; Jeffrey L. Streets

(57) ABSTRACT

The present invention provides a method and apparatus for chemically heating one or more components of, or intake air flowing to, an internal combustion engine by feeding hydrogen to a catalyst. In accordance with the invention, condensation of fuels on cold engine cylinder walls during and after cold start-ups is prevented, thereby reducing wear on the engine. The invention also provides a method and apparatus for reducing pollutants commonly occurring during cold start-up of combustion engines by heating components of, or intake air flowing to, a combustion engine, in order to quickly warm the engine and its catalytic converter to operating temperatures.

36 Claims, 10 Drawing Sheets

U.S. PATENT DOCUMENTS

| | | |
|---|---|---|
| 4,332,219 A | 6/1982 | Gonzalez |
| 4,382,189 A * | 5/1983 | Wilson .......................... 290/3 |
| 4,416,224 A * | 11/1983 | Hobby et al. .................. 123/3 |
| 4,430,095 A * | 2/1984 | Gilbert ..................... 48/180 C |
| 4,475,483 A * | 10/1984 | Robinson ................... 123/1 A |
| 4,499,864 A | 2/1985 | Lovercheck |
| 4,685,430 A | 8/1987 | Ap |
| 4,763,610 A | 8/1988 | Thomas |
| 4,858,582 A * | 8/1989 | Brown ...................... 123/523 |
| 4,865,818 A | 9/1989 | Merry |
| 4,884,531 A * | 12/1989 | Degnan, Jr. et al. ............ 123/3 |
| 4,939,902 A | 7/1990 | Retallick |
| 4,985,210 A | 1/1991 | Minami |
| 5,074,273 A * | 12/1991 | Brown ...................... 123/538 |
| 5,130,109 A | 7/1992 | Wan |
| 5,155,995 A | 10/1992 | Kinnear |
| 5,184,462 A | 2/1993 | Schatz |
| 5,207,734 A | 5/1993 | Day |
| 5,216,880 A | 6/1993 | Aoki |
| 5,259,190 A | 11/1993 | Bagley |
| 5,263,318 A | 11/1993 | Oota |
| 5,272,871 A * | 12/1993 | Oshima et al. ............... 60/274 |
| 5,412,946 A | 5/1995 | Oshima |
| 5,419,121 A | 5/1995 | Sung |
| 5,441,401 A | 8/1995 | Yamaguro |
| 5,806,305 A * | 9/1998 | Miller et al. .................. 60/274 |
| 5,813,222 A | 9/1998 | Appleby |
| 5,845,485 A | 12/1998 | Murphy |
| 5,914,294 A * | 6/1999 | Park et al. .................. 502/417 |
| 5,947,063 A * | 9/1999 | Smith et al. .................... 123/3 |
| 5,953,908 A * | 9/1999 | Appleby ..................... 60/275 |
| 5,964,089 A * | 10/1999 | Murphy et al. ............... 60/286 |
| 6,012,417 A * | 1/2000 | Neelakantan ............... 123/1 A |
| 6,036,827 A * | 3/2000 | Andrews et al. ............ 204/252 |
| 6,048,500 A * | 4/2000 | Caren et al. ............. 422/186.3 |
| 6,122,909 A * | 9/2000 | Murphy et al. ............... 60/286 |

* cited by examiner

METHOD AND APPARATUS FOR WARMING INTAKE AIR TO AN INTERNAL COMBUSTION ENGINE

This application is a continuation-in-part of U.S. patent application Ser. No. 08/682,024 filed on Jul. 16, 1996, now U.S. Pat. No. 5,845,485.

BACKGROUND OF THE INVENTION

1. Field of the Invention

The present invention relates to internal combustion engines and methods and apparatus for improving the cold start-up of internal combustion engines.

2. Background of the Related Art

There are several problems that must be overcome during the start-up of an internal combustion engine that is cold. First, atomized or vaporous fuel in the air/fuel mixture introduced into the engine cylinders tends to condense onto the cold engine components, such as cylinder walls and the air intake rail, especially in compression ignition (CI) engines such as diesel engines. Condensed hydrocarbon fuels on engine cylinder walls may act as solvents that wash away desirable lubricant films resulting in excessive mechanical wear from reciprocating piston rings in sliding contact with the engine cylinder walls. The condensed mixture of fuel and lubricant is capable of passing the piston rings, entering the crankcase and contaminating the engine's lubrication reservoir resulting in a loss of overall lubricant effectiveness and a further increase in mechanical wear, even during normal operation. Second, the condensation of atomized or vaporous fuels onto cold engine cylinder walls results in poor engine performance and delayed engine availability during and immediately after cold engine start-up. Engine availability is diminished during cold engine start-up due to poor lubricant properties at low temperatures, non-uniform fuel distribution and improper air/fuel mixtures. Third, if the vehicle is equipped with a catalytic converter increased levels of unwanted pollutants are emitted from the tailpipe for a period of about one to three minutes after cold engine start-up because that is the amount of time normally needed for the engine exhaust gases to heat the catalytic converter in the exhaust system to an efficient operating temperature.

The undesirable levels of pollutants released during and immediately after cold engine start-up present a problem of increasing importance. In order to meet increasingly strict governmental engine emission standards, a catalytic converter must be located in the exhaust stream of the engine. The conventional method of heating the catalytic converter to its efficient operating temperature is to heat the catalyst by passing high temperature exhaust gases from the engine through the catalyst. This exhaust gas heating, in conjunction with the exothermic nature of the oxidation reactions occurring at the catalyst, will usually bring the catalyst to an efficient operating temperature, or "light-off" temperature, in one to three minutes. However, until the catalyst light-off temperature is reached, the engine exhaust gasses pass through the catalytic converter relatively unchanged, and unacceptably high levels of pollutants such as carbon monoxide, hydrocarbons and nitrogen oxides are released into the atmosphere.

The elimination of excessive mechanical wear during cold engine start-up, poor engine performance during cold start-up, and the control and suppression of unwanted emissions created by cold start-up, are primary considerations for designers of internal combustion engines and manufacturers of chemical lubricants and fuel additives designed to alleviate these problems. A significant part of overall engine wear occurs during and immediately after cold start-ups, especially in diesel engines which are otherwise extremely durable due to the lubricating effect of diesel fuel at normal operating temperatures. A high percentage of the undesirable emissions or pollutants created by internal combustion engines equipped with catalytic converters occur during cold start-ups. Therefore, an apparatus and method is needed to prevent unwanted engine wear, to improve the operational availability of engines upon cold start-up, and to control and suppress undesirable levels of pollutants during cold start-up of combustion engines.

The problems of cold engine start-up can be addressed by leaving the engine running continuously, but the unwanted result of this method is excessive fuel consumption and related emissions. Various methods of adding heat energy to an internal combustion engine prior to or during start up have been proposed. These methods include adding heat energy to the engine crankcase, fuel, intake air or cylinder block before attempting to start the engine. Successful preheating systems include electrical resistance heating systems (including glow plugs, crankcase heaters and block heaters) and volatile and hydrocarbon based fuel burners. Acceptable methods of preheating are dictated by the availability and portability of the energy source, preheat time requirements and by safety concerns.

Electrical resistance heating is a common and successful method of adding heat energy to an internal combustion engine either prior to starting or after starting to bring the engine to operating temperature. Limitations of the equipment, however, affect the suitability of this method. The primary limitation on electrical preheating is the amount of electrical energy required by the heater. The typical automotive battery is not a practical source to supply the electrical power needed to preheat an internal combustion engine because the electrical load on the vehicle battery may exceed the rated battery output. In any event, the repeated electrical demand necessary for engine preheating in cold temperatures will unacceptably shorten the battery life of the typical automotive battery.

An alternative to battery powered electrical resistance heating has been to decrease the strain on the power supply by supplying the electrical power directly from an alternator after the engine has started rather than directly from the vehicle battery. This solution also has its shortcomings. First, the initial start-up of the engine to drive the alternator is necessarily done without preheating, resulting in excessive mechanical wear, unwanted pollutants and poor performance. Second, an alternator-powered electrical resistance heater still requires a substantial increase in battery capacity to cope with the start-up scenario. Even by supporting the engine heater with electrical power from an alternator, there is still a concern with respect to battery capacity because electric resistance heating will likely be needed for an extended period of time. In addition, the maximum alternator power output required by the system requires a complicated switching mechanism to shut down the heater once the engine achieves a suitable operating temperature and an increased alternator speed to 2,000 to 4,500 rpm during the heating period. There will also be an increased up-front automotive cost because the alternator must be oversized for typical automotive electrical power demand in order to support the heater during and after engine start-up.

To date, there has not been an automotive engine heating system which gives almost instantaneous heating of the engine components or intake air without the inherent drawbacks stated above. Thus, there remains a need for an improved system for preheating internal combustion engine components or intake oxygen or air that reduces excessive mechanical wear and poor engine performance and which minimizes undesirable emissions by accelerating the attainment of full engine and catalytic converter performance. Such a system must be simple and must not reduce the rated lifetime of the engine, the catalytic converter, or the battery and other electrical components of the vehicle.

SUMMARY OF THE INVENTION

The present invention provides a catalytic heating apparatus for reducing wear, reducing emissions and improving operational availability of a combustion engine. The apparatus heats combustion engine components and/or intake air to an engine and comprises: a catalyst; a source of hydrogen; a conduit connecting the source of hydrogen to the catalyst; a temperature sensor in the catalyst; a temperature sensor in the engine; and a means for controlling the introduction of hydrogen from the source of hydrogen to the catalyst based on a temperature sensed by the temperature sensors.

The present invention provides a method for reducing wear, reducing unwanted emissions and improving operational availability of a combustion engine comprising: disposing a hydrogen oxidation catalyst in the air intake line; catalytically combining hydrogen and oxygen on the catalyst to produce heat; and transferring the heat to the air by contacting the catalyst and by mixing the intake air with the gasses produced by the exothermic oxidation of hydrogen.

BRIEF DESCRIPTION OF THE DRAWINGS

So that the manner in which the above-recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF A PREFERRED EMBODIMENT

The present invention relates to accelerating the operational availability of internal combustion engines, including both compression ignition and spark ignition engines, by shortening the required "warm-up" period between cold start-up and achieving efficient operating temperature. The present invention is also effective for minimizing mechanical wear in internal combustion engines resulting from unwanted condensation of atomized or vaporous fuel on cold cylinder walls during start-up of combustion engines. Furthermore, the present invention provides for improved catalysis for the reduction of emissions during cold start-up of internal combustion engines.

More particularly, the present invention relates to a method and apparatus for warming internal combustion engine components such as the block, intake air (oxidant) to the engine, fuel to the engine, the engine lubricant, the battery or other devices associates with internal combustion engines using resident or on-board equipment and resulting in decreased mechanical wear, accelerated operational availability and improved catalysis of engine exhaust gases. The present invention provides a method and apparatus for heating components of an internal combustion engine by utilizing stored chemical energy in the form of hydrogen, such as by supplying the hydrogen to a catalyst or a fuel cell. The invention also provides a method and apparatus for preheating a catalyst in order to enhance the conversion of unacceptable emissions emanating from an internal combustion engine into water and other acceptable emissions.

In one aspect of the invention, hydrogen is supplied from an electrolyzer or other hydrogen source and injected into or upstream of a catalyst that promotes the flameless oxidation or catalytic combination of the injected hydrogen and oxygen in an exothermic reaction. Heat from the oxidation of hydrogen is used to preheat engine components and/or intake air flowing to the engine through conductive or convection heat transfer. In one embodiment, the water vapor resulting from the catalytic oxidation of hydrogen mixes with and flows with the warmed intake air into the engine cylinders. In another embodiment, the water vapor may be physically isolated from the warmed intake air by use of a heat exchanger. In the alternative embodiment, the catalyst, a separate stream of combustion air (or oxygen) and the stream of hydrogen are confined to one passage or side of a heat exchanger, and in thermal contact with intake air passing through another passage. A shell and tube heat exchanger and counterflow arrangement may be preferred for the latter embodiment. The accelerated heating of combustion engine components and/or intake air to the engine will prevent excessive mechanical wear, improve operational availability of the engine, and will decrease emissions by accelerating operational availability of the catalytic converter located in the exhaust line of an automobile.

Figure 1:
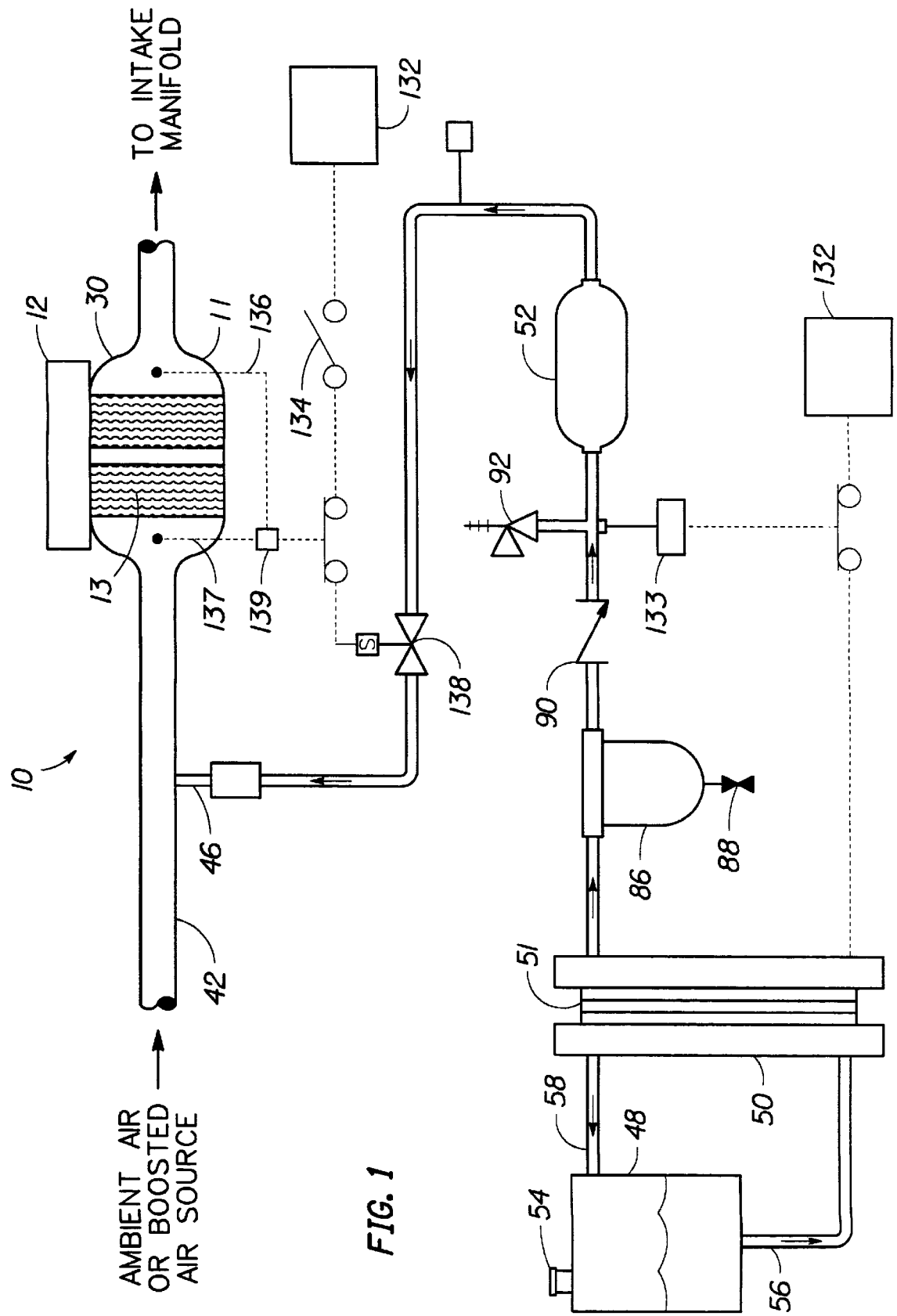
FIG. 1 is a schematic diagram of the apparatus of the present invention for heating combustion engine components and/or intake air flowing to a combustion engine.

FIG. 1 shows a system 10 of the present invention installed in thermal communication with a selected vehicle engine component 12 and in the air intake line 42 providing air to the intake manifold of the engine. The engine component 12 is in direct contact with the catalyst 13 so as to provide conductive heat transfer from the catalyst to an engine component such as the crankcase, block, heads or intake manifold. The vehicle includes a catalyst 11 disposed within the air intake line 42. The air intake line 42 is provided with air from ambient air or boosted air from an air source such as an air pump, turbocharger or supercharger, and hydrogen from a hydrogen inlet line 46. The air flowing into the catalyst may be from any suitable air source for feeding air to and through the catalyst region of the air intake line at a suitable pressure and volumetric flow rate to achieve the ideal air/hydrogen mixture.

The hydrogen supply system of the invention generally includes a water reservoir 48, an electrolyzer 50, and a hydrogen storage cylinder 52. As shown in FIG. 1, the electrolyzer 50 may preferably compromise a plurality of stacked cells 51. The reservoir 48 may serve as a water reservoir and as a separator for oxygen and water. The reservoir 48 may be a vehicle's windshield washer fluid storage container, but is preferably a dedicated separator allowing collection and storage of oxygen via port 54. Water flows by gravity drain or is pumped from the reservoir 48 to the electrolyzer 50 via a drain line 56. If the reservoir is suitably elevated with respect to the electrolyte, then as the electrolyzer produces hydrogen and oxygen the oxygen and entrained water will flow naturally back to the reservoir 48 via a return line 58.

Figure 2:
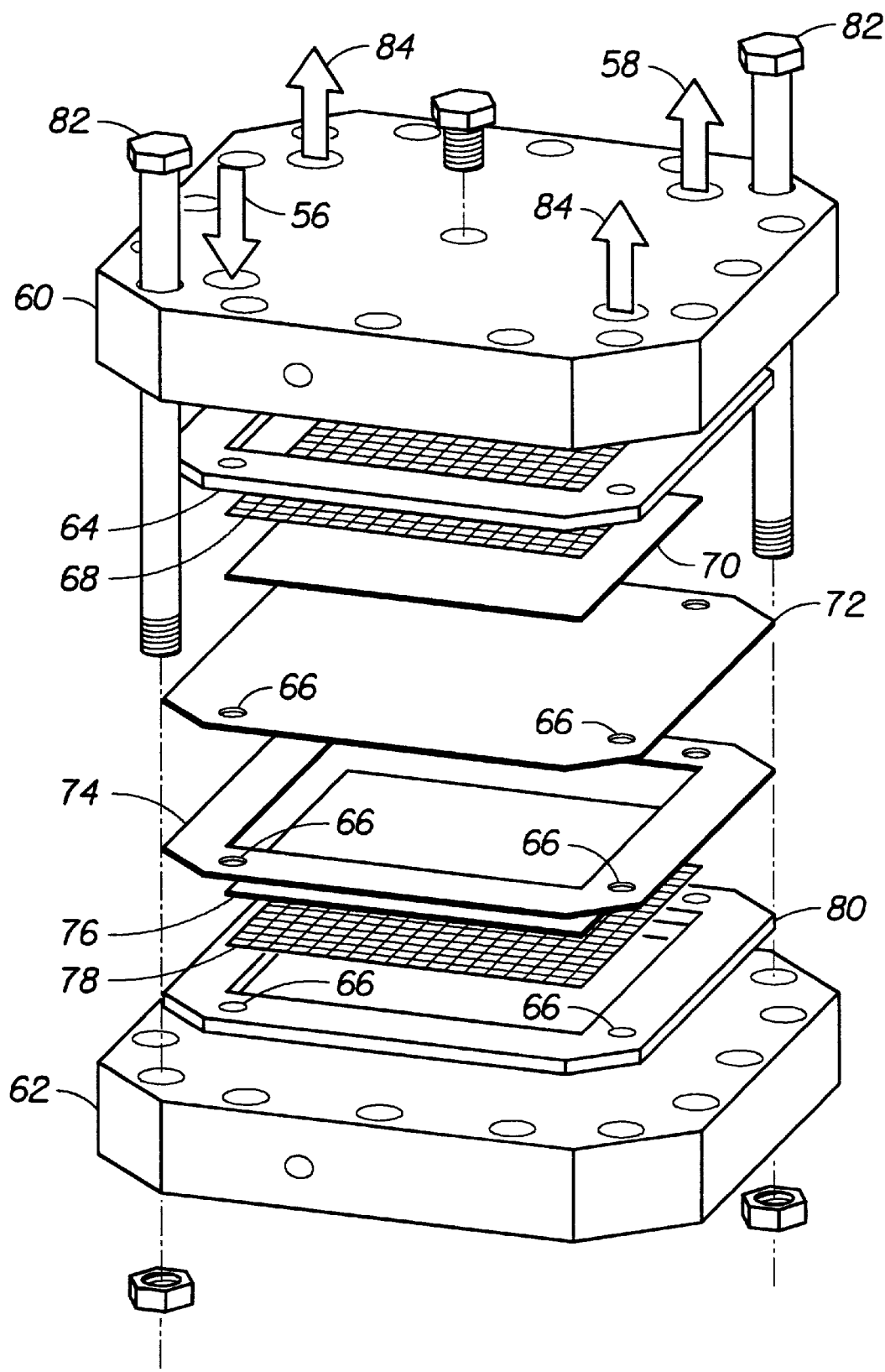
FIG. 2 is an exploded view of a preferred electrolyzer that may be employed in the present invention to provide a source of hydrogen.

The next major component of the hydrogen source is the electrolyzer 50, shown in greater detail in FIG. 2. In the following description of the electrolyzer 50, the materials of construction referred to as "preferred" are the material actually used in a test device to prove that the invention would work for its intended purpose. In commercial production models of the present invention, where possible, less expensive materials will be used throughout, such as carbon steel for titanium where possible, and plastic such as polypropylene where heat and stress will permit the use of such material.

The electrolyzer 50 may be referred to herein as a proton exchange membrane (PEM) electrolyzer 50. The proton exchange membrane itself may prove corrosive in this environment in contact with certain substances, thus requiring the careful selection of the material of construction of the electrolyzer. For example, the PEM should only contact stainless steel, titanium, carbon, graphite or other suitable material. However, those of skill in the art will readily recognize where less exotic materials than those listed in the following discussion that are located away from the PEM material itself and the oxygen electrode catalyst can be readily employed without penalty. For example, graphite will be the material of choice in certain structural elements, and not some obvious candidates such as copper, aluminum, or iron, which can corrode thus forming ions that can poison the oxygen and/or hydrogen electrode catalysts.

The invention described herein may be used to prevent excessive mechanical wear, improve operational availability and decrease unwanted pollutants by introducing hydrogen and oxygen or air into the catalyst prior to or immediately upon start-up of the engine. The hydrogen and oxygen or air is supplied to the catalyst, and the intake air flowing to the engine is warmed by the exothermic catalytic combination of hydrogen and oxygen until the engine and/or catalyst reach acceptable operating temperatures. At that time, the hydrogen supply is shut off. Replenishment of the hydrogen and oxygen storage vessels is accomplished by powering the electrolyzer using the engine-driven alternator during normal engine operation.

Now referring to FIG. 2, the PEM electrolyzer 50 is shown as a cell stack including a pair of endplates 60 and 62. The endplates 60 and 62 are preferably stainless steel and measure 4.2"×4.2"×¾". Adjacent the top endplate 60 is an anodic cell frame 64. The cell frame 64 is preferably a carbon fiber-filled TEFLON sheet, sold under the trademark ZYMAXX by Du Pont. The cell frame 64 retains a 1:1 molar ratio of iridium and ruthenium dioxides ($IrO_2/RuO_2$) as the anodic electrocatalyst. The cell frame 64 also includes a plurality of flow ports 66 to permit the supply of reactant (water) and/or removal of electrolysis product (oxygen gas). Below the cell frame 64 is an expanded titanium metal current collector (flow field) 68, preferably 25 Ti 40-3/32from Exmet Corp. An anode substrate 70 is preferably a porous titanium plate measuring 2.49"×2.49"×0.05". Below the anode substrate 70 is a proton exchange membrane 72, cut from a sheet of NAFION 117 from Du Pont which serves as a solid electrolyte material and which is 175 $\mu$m thick.

FIG. 2 depicts a gasket 74, one of perhaps several installed where required. Gaskets 74 are stamped from 0.033" thick fluorosilicone sheet (VITON) and from 0.005" thick unsintered PTFE sheet. The electrolyzer 50 further includes a cathode substrate 76 like the anode substrate 70 and an expanded titanium flow field.

Finally, the PEM electrolyzer 50 includes a cathodic cell frame 80 formed of polychlorotrifluoroethylene (PCTFE) sheet, sold under the trademark KEL-F by Afton Plastics. The cathodic cell frame 80 retains a fuel cell gas diffusion electrode containing high surface area colloidal platinum, supported on platinum black, having platinum loading of 4.0 mg/cm$^2$ as the cathodic electrocatalyst layer.

As shown in FIG. 2, the various components of the PEM electrolyzer are stacked together and retained with a plurality of tie rods 82, preferably 16 such tie rods. Stainless steel tubing, such as SS316, are then screwed into four threaded ports on one of the titanium endplates. The ports include the water inlet port 56, the oxygen outlet port 58, and a pair of hydrogen outlet ports 84. To minimize electrical contact resistance, the endplates 60 and 62 and the expanded titanium metal current collectors 68 and 78 may be electroplated with a thin film of gold or other noble metals, such as platinum.

The cathode and the anode of the electrolyzer are of special construction. The cathodic electrode structure for hydrogen evolution is fashioned from a commercially available fuel cell gas diffusion layer on a carbon cloth backing, which acts as a support for the active hydrophilic electrocatalyst layer. This active layer contains high surface area colloidal platinum (100 m$^2$/g), supported on carbon black (60 wt % Pt on C), yielding a platinum loading of 4.0 mg/cm$^2$. The cathodic electrode structure, having an area of 40 cm$^2$, was hot-pressed onto one side of a segment of precleaned NAFION 117 PEM material. Hot-pressing was carried out between the plates of a hot-press elevated to 200° C. for 60 seconds, and using a force of 15,000 pounds.

For the anodic electrocatalyst layer, a 1:1 molar ratio of iridium and ruthenium chlorides are dissolved in ca. 8 ml of concentrated HCl and heated to almost dryness. The resulting chlorides are then dissolved in isopropanol to make an ink-like coating. A porous titanium plate, 0.05" in diameter from Astro Met of Cincinnati, Ohio, is etched in 12% $HBF_4$ for 60 seconds and rinsed with isopropanol. This substrate is then coated with the ink-like mixture and the solvent evaporated under low heat of about 90° C. This coating and drying procedure is repeated seven times, then the electrode is heated in a furnace at 400° C. for 10 minutes in ambient air. The coating, drying, and furnace treatment is repeated twice more, but with a final baking time of two hours instead of 10 minutes.

Figure 3:
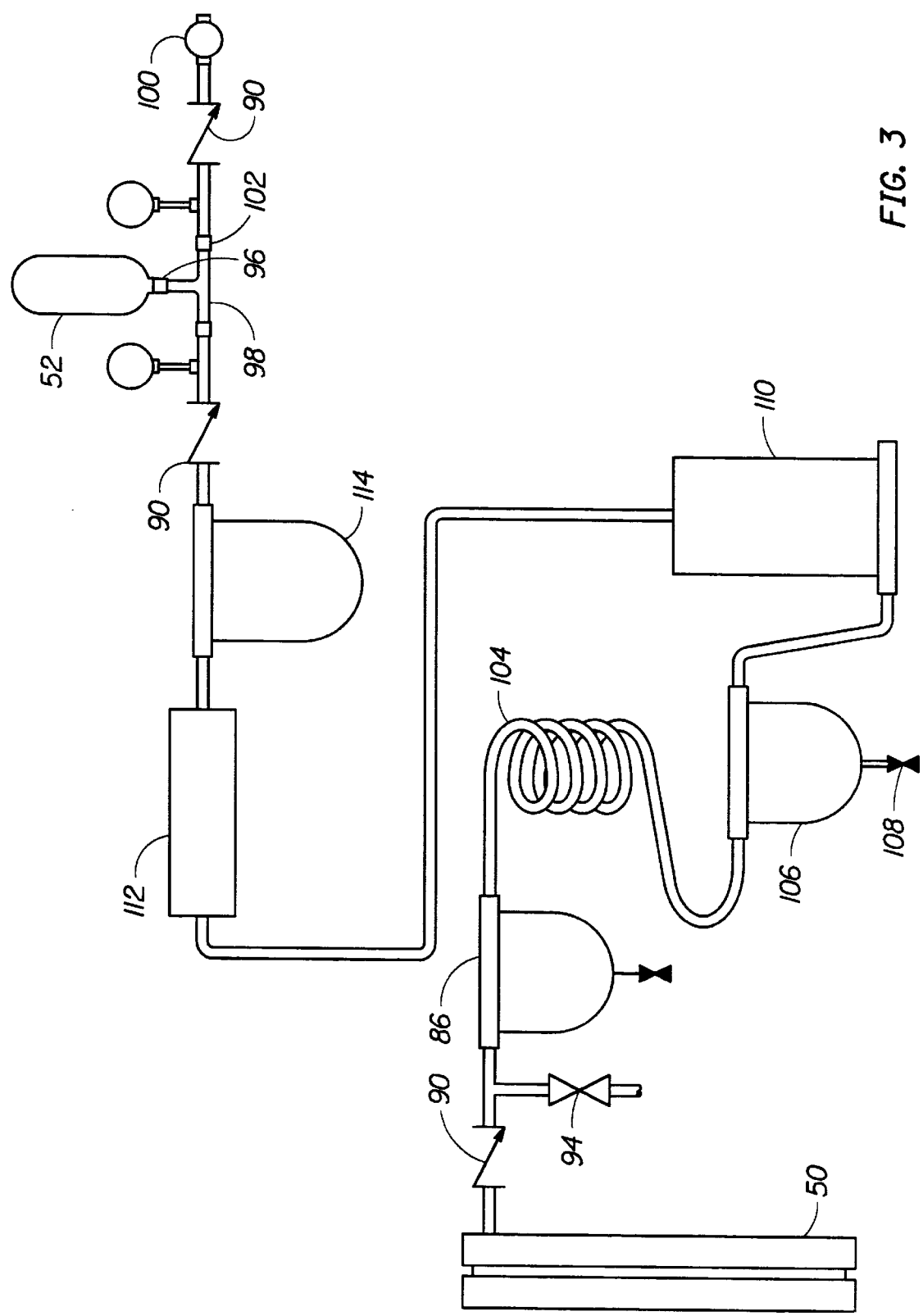
FIG. 3 is a schematic of a hydrogen-capturing and handling detail of the system of the present invention.

Referring back to FIG. 1, the system further includes a hydrogen storage cylinder and various supporting components in addition to the reservoir 48 and the electrolyzer 50, described above. The components include a liquid water trap 86 to eliminate most of the entrained water from the hydrogen exiting the electrolyzer, a solenoid valve 88 to blow out the trap, a check valve 90, and a pressure relief valve 92 to protect the system against over pressurization. FIG. 3 depicts additional details and a preferred arrangement of the hydrogen gas handling and capture system.

As previously described, the electrolyzer 50 includes a proton exchange membrane so that generated oxygen is vented to the water source reservoir and the hydrogen generated can be accumulated at pressure. Prior to operation, the system of FIG. 3 permits purging with an inert gas, such as nitrogen. For safety reasons, all air is first removed from the system by attaching a nitrogen gas feedline at a purge gas inlet 94 downstream of a check valve 90. During the purging operation, the hydrogen storage cylinder or vessel 52, such as a metal hydride vessel, is detached at a quick disconnect 96. This operation effectively seals both the vessel 52 and a gas line 98, to keep the purge gas out of the vessel 52. The remainder of the system is then purged from the purge gas inlet 94 through a back pressure regulator 100.

To charge the system with hydrogen, the needle valve 102 between the storage vessel 52 and the back pressure regulator 100 is closed. Hydrogen gas generated by the electrolyzer is processed through a four-stage process to remove entrained water (liquid or vapor) and any oxygen contaminant from the hydrogen stream before storage. The first step involves removal of a small amount of entrained liquid water coming from the electrolyzer in the hydrogen gas. This entrained liquid water is removed without a pressure loss by means of the entrained liquid water trap 86. The second step involves cooling the hydrogen gas stream from the electrolyzer temperature to ambient in a condensing coil 104. The electrolyzer typically operates at about 20° C. above ambient, with the exact temperature depending on specific electrolyzer operating conditions. This second step condenses a substantial portion of the water vapor in the hydrogen gas stream. This condensed water could absorb a significant amount of alcohol, which may be present during operation using windshield washer fluid as the electrolyzer reactant feed. The condensate is collected in a condensate collector 106 and removed through a drain valve 108.

At this point, the hydrogen gas stream is still saturated with water vapor, but now at a lower temperature. This saturated gas stream is next passed into a zeolite-filled gas drier 110. This drier absorbs water vapor and any alcohol vapor present when using a windshield washer fluid feed. Any oxygen contaminant present in the hydrogen gas stream is then eliminated in a catalytic recombiner or oxygen eliminator 112 to reduce it to water. Final clean-up of the hydrogen gas stream is accomplished in a second zeolite absorber bed in a polishing drier 114. The polishing drier removes traces of water produced by the catalytic recombiner 112.

The hydrogen gas handling system of FIG. 3 is designed for relatively short term operation; longer term operations, for example 100,000 miles, would utilize other methods of water removal known in the art. A satisfactory metal hydride hydrogen storage unit is available from Hydrogen Consultants of Littleton, Colo. Such an available unit can store 30 liters of hydrogen that can be delivered at 30–45 psig, with recharging using hydrogen gas at 100–200 psig. More preferably, the hydrogen storage vessel is a pressure vessel made of a composite structure, aluminum or ferrous-based alloys. A suitable hydrogen storage vessel of this type is available from Harless Specialties.

Figure 4:
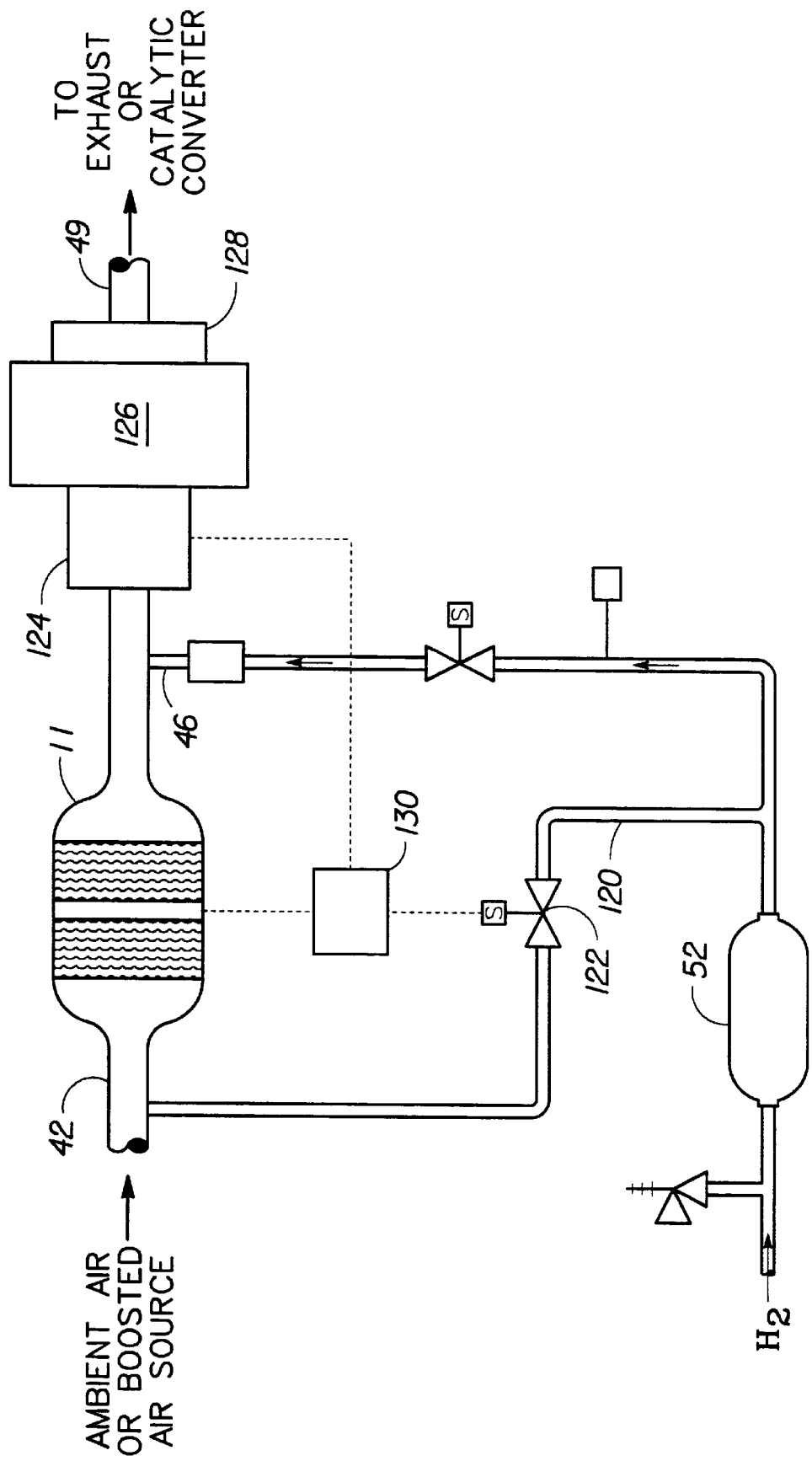
FIG. 4 is a schematic diagram of the apparatus of the present invention depicting a system for the combustion of hydrogen for cold start-up assist for an internal combustion engine.

Now referring to FIG. 4, one aspect of the invention provides an on-board hydrogen ignition assist system. A source of hydrogen, such as the electrolyzer described above or any suitable means, fills the hydrogen storage cylinder 52. An ignition supply line to a control valve 122 controls the supply of hydrogen into an engine ignition 124. The engine ignition 124 includes the fuel, air, and electrical components for an internal combustion engine 126. Thus, the hydrogen can be supplied at any convenient location so that it is injected into the cylinders of the engine 126. For example, hydrogen under pressure can be supplied to the intake manifold where there is already a fuel/air mixture (during the inlet cycle), or the hydrogen can be mixed with air before it goes to the engines fuel injection system, or other means.

The system of FIG. 4 turns the internal combustion engine 126 into a hydrogen fuel injected engine for the first few seconds of start-up, before any carbonaceous fuel, such as diesel, methanol, gasoline or gasohol, is introduced into the engine. During this initial start-up period using hydrogen, no carbon-based pollutants (such as carbon monoxide or unburned hydrocarbons) flow from the engine. Using this arrangement, the engine exhaust contains no carbon (although it may contain nitrogen oxides) until the catalytic converter is warmed to light-off temperature. While a hydrogen fuel injected engine may still produce nitrogen oxides, the amount of nitrogen oxides is depressed due to the low engine temperature at startup and the presence of hydrogen in the combustion chamber. During the use of hydrogen fuel, the catalytic converter in the exhaust stream may be heated to a light off temperature by the exhaust gases or by independently introducing hydrogen to the catalyst in a catalytic converter. When a carbonaceous fuel is finally injected into the engine, the catalytic converter may already be heated to a more efficient operating temperature.

Expended fuel gases are collected in an output manifold 128 and flow into the exhaust line 49. An ignition control 130 provides control signals to the control valve 122 for the introduction of hydrogen and to the engine ignition 124 to coordinate hydrogen introduction during cold start operations. The on-board hydrogen ignition assist system functions with or as without the catalyst conditioning system but preferably included with such a system since they may both use the hydrogen generation and on-board storage.

Figure 5:
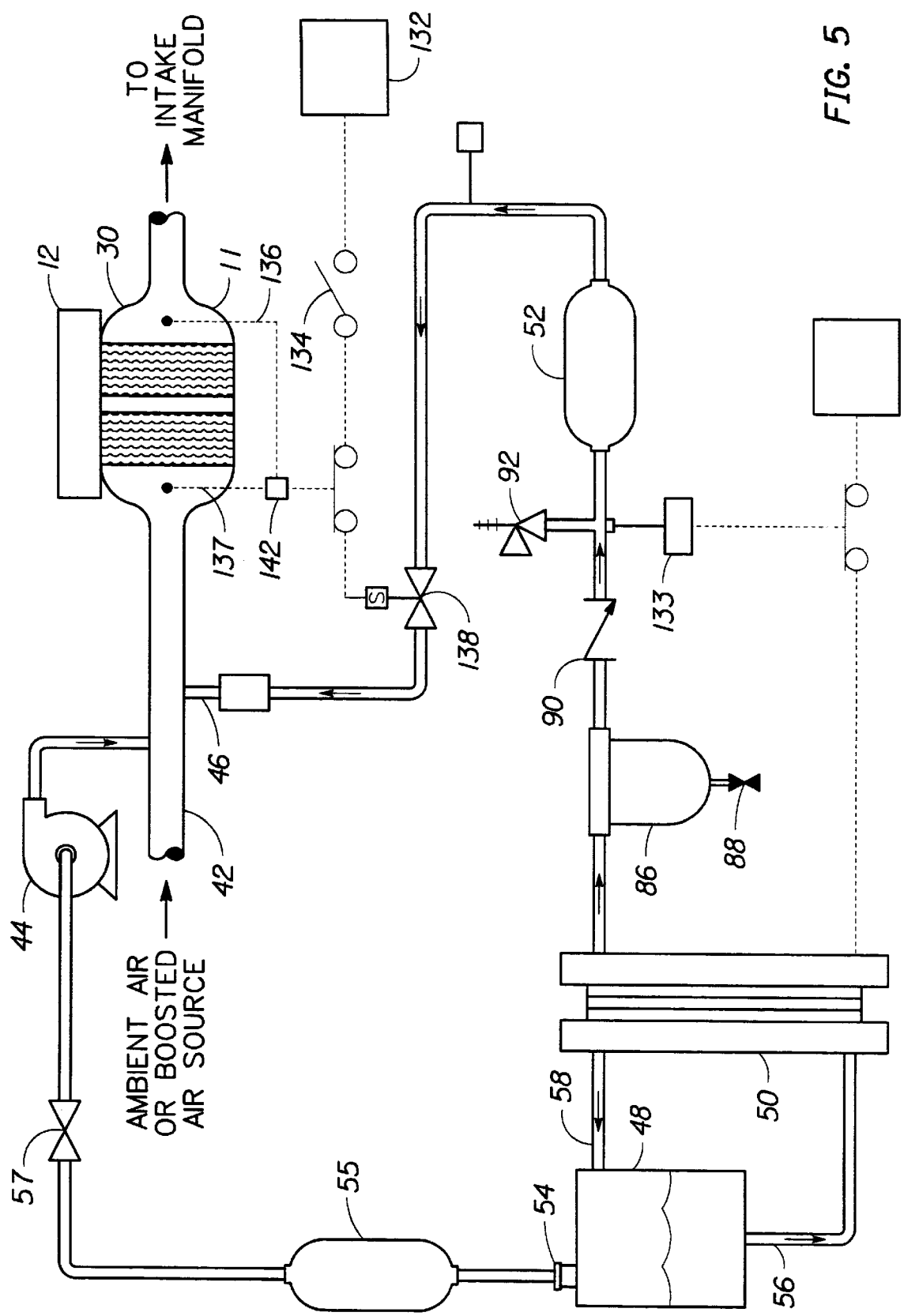
FIG. 5 is a schematic diagram of a system having oxygen recovery and storage equipment providing for injection of oxygen into the catalytic converter for heating components of a combustion engine.

Another aspect of the invention provides oxygen recovery from the electrolyzer. Now referring to FIG. 5, a schematic diagram of a system having oxygen recovery and storage equipment is shown providing for injection of oxygen into the catalytic converter. The oxygen separated from water in the water reservoir 48, passes through the port 54 and is collected in a storage vessel or cylinder 55. During ignition, and perhaps during all operation of the vehicle, the oxygen may be released from the vessel 55 by opening a valve 57 and input into the air stream, perhaps containing an air pump 44. In this manner, the oxygen enriches the air and provides more efficient combustion of the hydrogen or exhaust gases within the catalytic converter 11.

Referring back to FIG. 1, a power source 132 is coupled to the hydrogen solenoid valve 138 upon engaging the ignition switch 134. The solenoid valve 138 may remain open or be controlled or pulsed as instructed by a control signal from the microprocessor controller 142. The controller 142 is preferably in electronic communication with a first thermocouple 136 positioned in the air intake line 42 downstream of the catalyst 13 and a second thermocouple 137 positioned in the air intake line 42 upstream of the catalyst 13. In one preferred mode of operation, the controller 142 controls the valve 138 to provide hydrogen in an efficient manner, perhaps according to a predetermined delivery pattern, until the thermocouple 136 downstream of the catalyst indicates a preselected temperature. Preferably, the solenoid valve is a proportionally controlled solenoid valve or analog solenoid valve which can precisely meter the amount of hydrogen desired into the catalyst. A suitable proportionally controlled solenoid valve is a model VSONC-6S25-VD-F available from Pneutronics, Inc. of Hollis, N.H.

Also in FIG. 1, the electrolyzer 50 receives power from the source 132 when the hydrogen pressure in or near the hydrogen storage vessel 52, as indicated by pressure sensor 133, falls below a setpoint pressure between about 100 psig and about 400 psig. It should be recognized that the power to the electrolyzer 50 is turned off when the pressure exceeds a high as pressure setpoint, such as 400 psig. It should also be recognized that many other conditions may be considered in controlling the electrolyzer.

Figure 6:
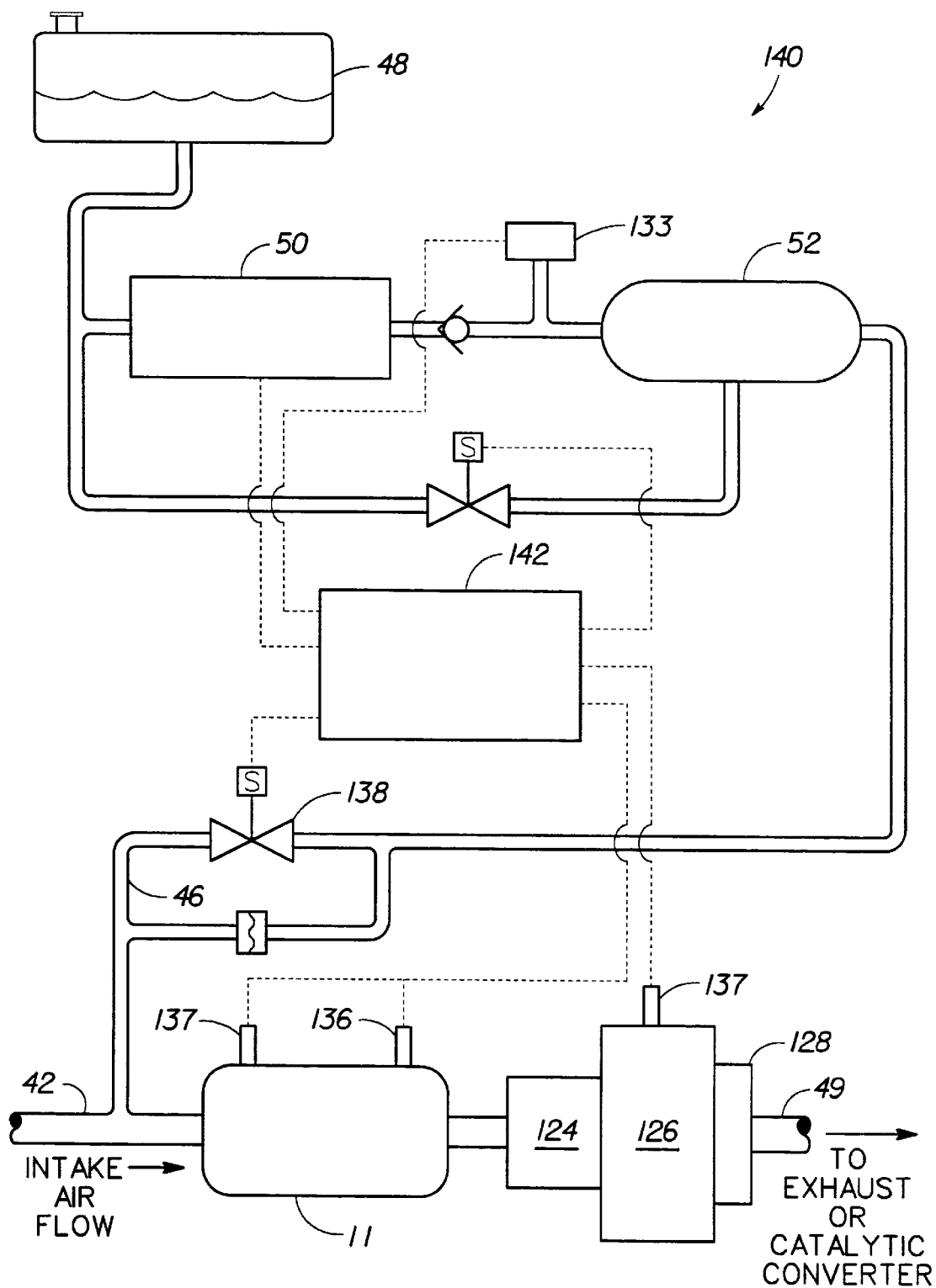
FIG. 6 is a control diagram of a prototype system using a microprocessor controller to monitor and control various functions of the system.

Now referring to FIG. 6, a control diagram illustrates a catalytic heating system 140, similar to that of FIG. 1, using a microprocessor controller 142 to monitor and control various functions of the system. For example, the temperature of the catalytic heating chamber 11 as measured by the thermocouple 136 is communicated to the microprocessor controller 142, and the temperature of the engine 126 as measured by thermocouple 137 is communicated to the microprocessor controller 142. The thermocouple 137 may be the thermocouple that measures the engine coolant temperature, a standard feature on most engines. The controller 142 may then send a signal to the hydrogen release valve 138 to adjust or close when either the engine or the catalyst temperature exceeds certain pre-selected threshold or maximum operating temperatures.

Furthermore, power to the electrolyzer 50 may be supplied under various conditions such as when the pressure sensor 133 indicates a low pressure in the storage tank 52. Other various control schemes, and other control considerations, may be employed as will become apparent by those with skill in the art in light of the foregoing disclosure. For example, the microprocessor may also be programmed to carry out timed control functions apart from responding to sensory inputs, and may also serve various safety functions.

Figure 7:
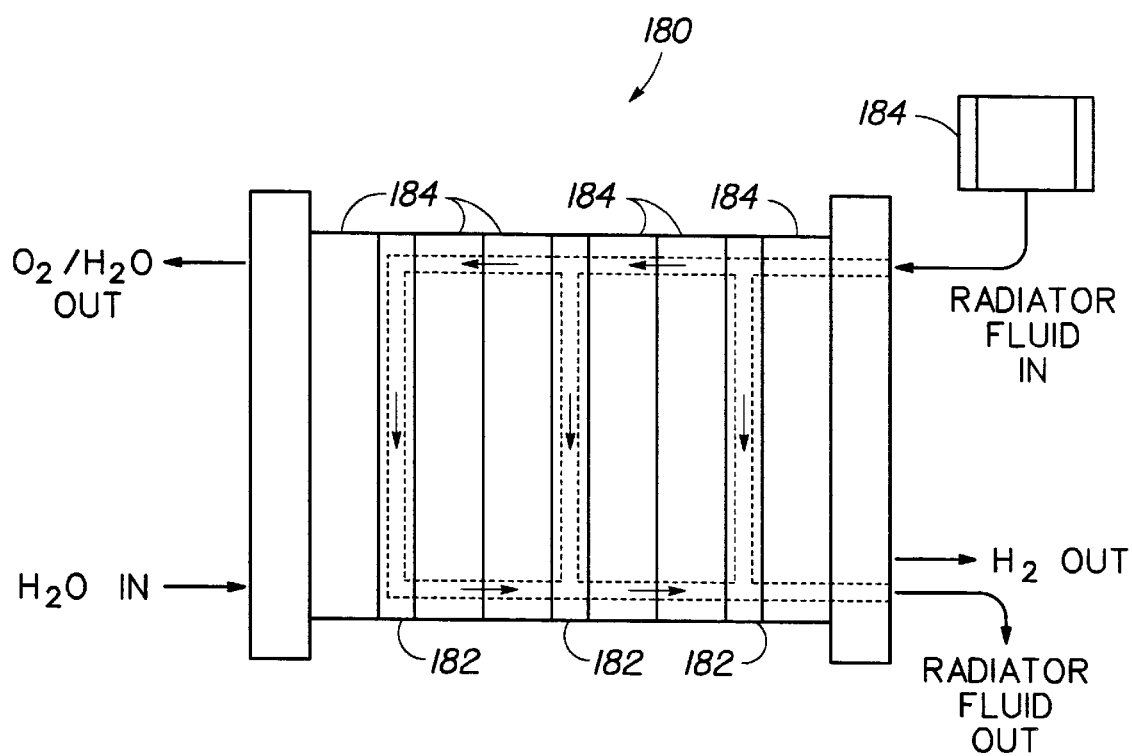
FIG. 7 is a schematic diagram of an electrolyzer having a thermal management cell for heating or cooling the electrolyzer using liquid from a vehicle radiator.

Now referring to FIG. 7, a schematic diagram of an electrolyzer 180 is shown having thermal management cells 182 for heating or cooling the electrolyzer using liquid from a vehicle radiator 184. The thermal management cells 182 may be comprised of plates providing a passage for the radiator fluid between electrolytic cells 184 in order to absorb or deliver heat to the electrolyzer. Because electrolyzers operate most efficiently at elevated temperatures, the radiator may be used to warm the electrolyzer in cold weather conditions. Alternately, the radiator fluid may be used to cool the electrolyzer after an extended period of use.

Figure 8A:
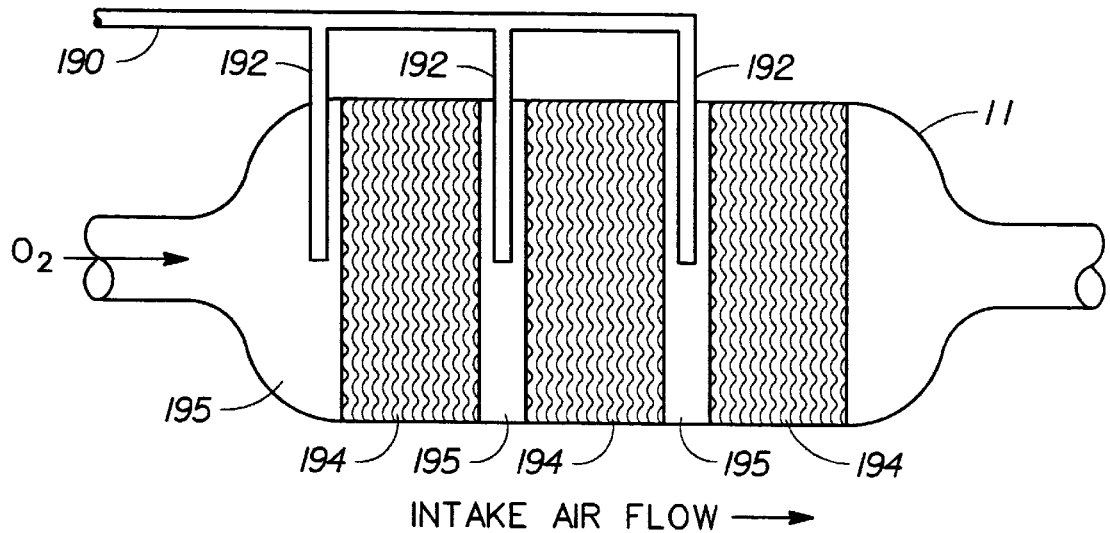
FIGS. 8(a) and 8(b) are catalyst monoliths having a hydrogen distributor.
Figure 8B:
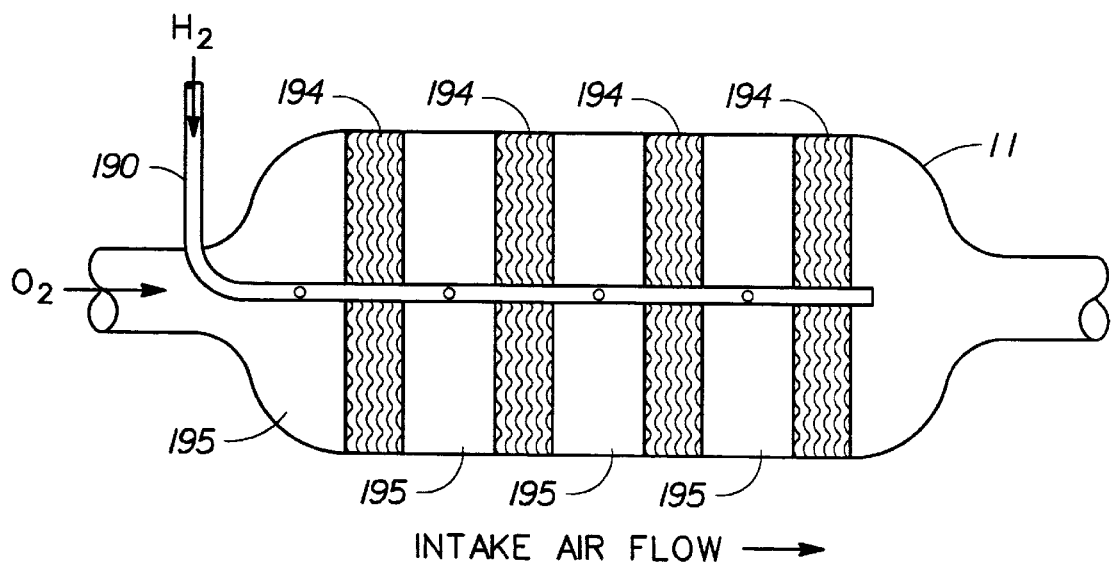

Now referring to FIGS. 8(a) and 8(b), two catalytic converters 11 are shown having hydrogen injection manifolds 190. In each of the figures, the converters 11 have multiple monoliths 194 separated by a short distance for hydrogen introduction and diffusion. In FIG. 8(a), the manifold is external to the converter 11 with a plurality of injection tubes 192 delivering hydrogen into the gaps 195. Conversely, in FIG. 8(b) the manifold is in the center of the monolith 194 with a plurality of holes for hydrogen delivery into the gaps 195.

FIG. 9 is a schematic flow diagram of a hydrogen injection system including hydrogen barriers disposed to limit where hydrogen may flow. More particularly, the hydrogen barriers are a catalyst coated monolith for the prevention of hydrogen back flow or escape into undesirable areas. A temperature sensor is preferably disposed on the leading edge (the edge that would first be exposed to hydrogen) and that temperature reading may be compared to ambient or the temperature in the same general location but not in contact with a catalyst. This temperature probe provides the system with another means of checking for hydrogen leaks. If hydrogen comes in contact with the hydrogen barrier catalyst, it may provide measurable heating and provide an indication that there is a problem with the system.

In the catalytic converter preheating system, a hydrogen barrier could also be used to prevent hydrogen from exiting the immediate area of the catalytic converter, i.e., from entering the muffler or more importantly from going back up the downpipe to the engine, any close coupled catalyst, or any other exhaust treatment system in the vehicle. In fact, the air intake manifold may contain a significant amount of the barrier catalyst to prevent the hydrogen from going back out the air intake and being trapped in the air cleaner.

When using a hydrogen barrier system, it is preferred to include a flame arrestor in the form of a monolith having no catalytic activity for hydrogen between the possible hydrogen source and the barrier catalyst. The arrestor prevents flash back of any flame to the source. For instance, in those situations where there is no forced air flowing over the barrier catalyst, it is possible that that surface will get sufficiently hot to light off any hydrogen in the system. If a flame arrestor is placed between the ignition source and the hydrogen source then only a small volume of hydrogen can catch fire in one lighting. For example, if the whole intake manifold became full of hydrogen, the flash back arrestor would prevent all the hydrogen from lighting off all at once by allowing a small amount of hydrogen through the arrestor where it could catch fire, but once the hydrogen and oxygen adjacent the barrier catalyst are consumed, then the fire will go out and stay out until there is enough of both again. It may be further desirable to provide a hydrogen detector for the purpose of detecting hydrogen in any unwanted areas of the engine, engine compartment, air system, cabin, etc.

Figure 9A:
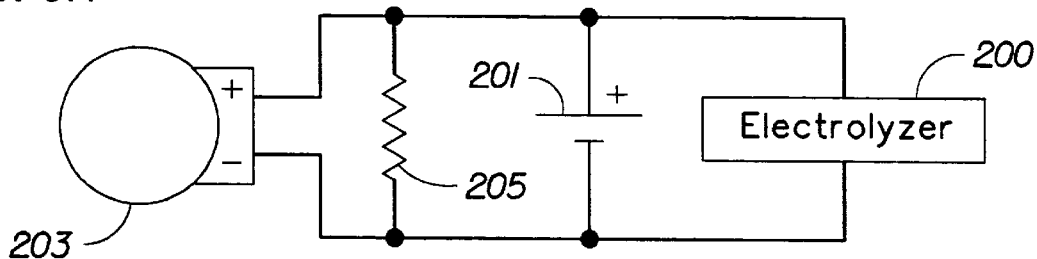
FIGS. 9(a), 9(b), 9(c) and 9(d) are schematic diagrams of four electrical systems for providing electrical power to the electrolyzer.
Figure 9B:
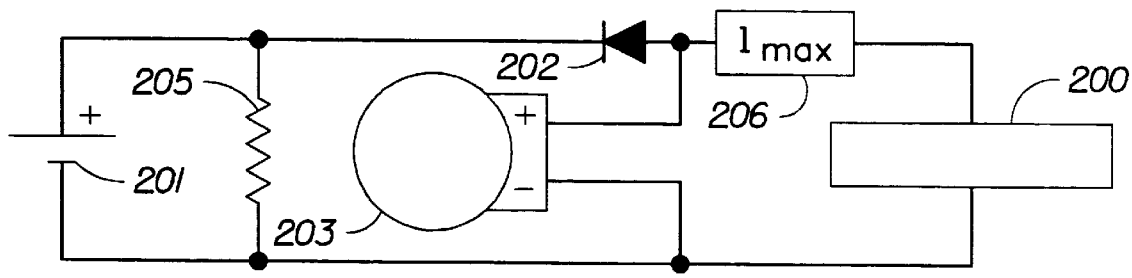
Figure 9C:
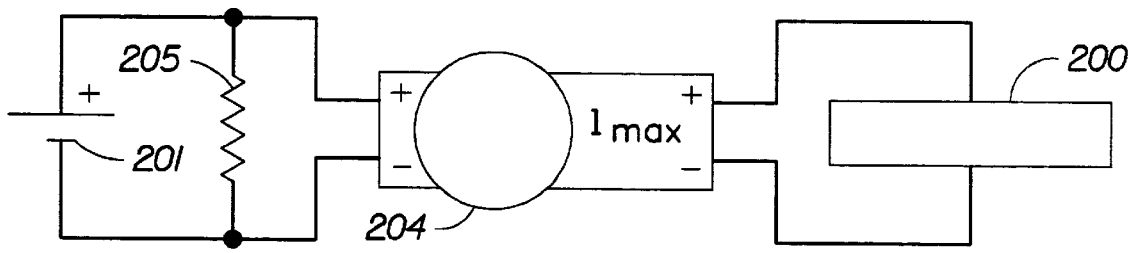
Figure 9D:
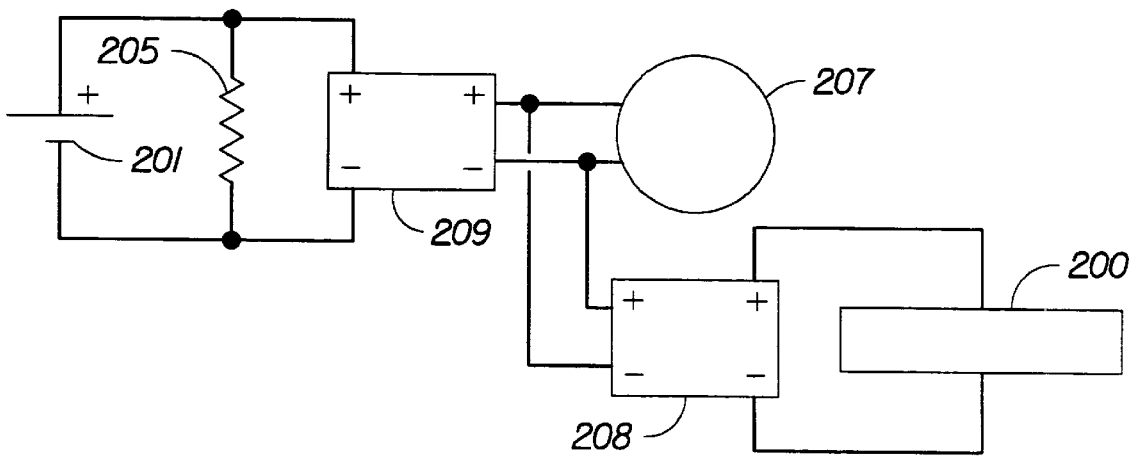

FIGS. 9(a) through 9(d) are schematic diagrams outlining four possible topologies for the powering of the electrolyzer system 200. In FIG. 9(a) the primary source of electrolyzer power is drawn directly from the vehicle battery 201 as well as from the alternator 203. FIG. 9(b) eliminates the electrical draw on the battery 201 by placing diode 202 between the alternator 203 and the battery 201. Diode 202 allows current flow from the alternator to the battery and other vehicle loads 205 but stops current flow from the battery to the electrolyzer 200. The current limiting circuit 206 protects the electrical system from over currents that could be drawn by the electrolyzer as the electrolyzer resistance changes. FIG. 9(c) is shown having an alternator 204 having an additional winding in which the magnetic circuit provides current limiting to the electrolyzer 200. This second winding would also allow higher voltages to be delivered to the electrolyzer 200, allowing the number of cells within the stack to be increased. FIG. 9(d) shows a system in which the vehicle alternating current is drawn from the alternator 207 before the vehicle regulator 209 and a separate current control/regulator 208 provides electrical power to the electrolyzer 200. This topology is able to current limit the electrolyzer load and provide higher voltages to the electrolyzer while using a conventional alternator.

Figure 10:
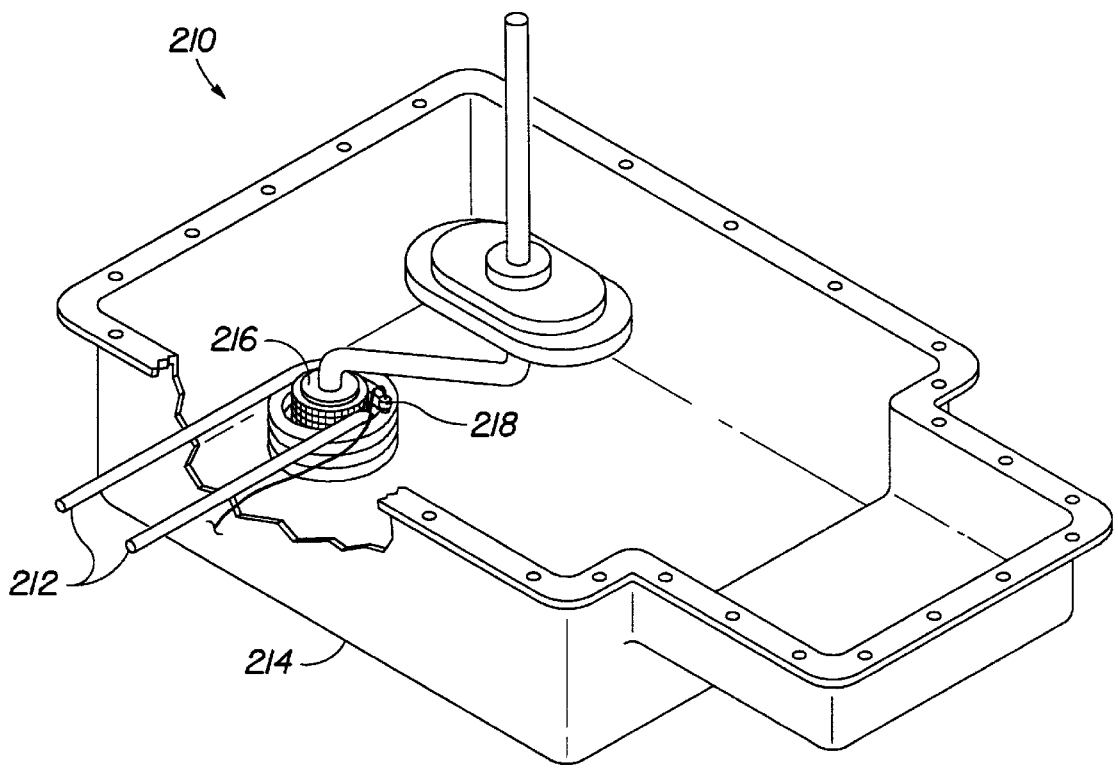
FIG. 10 is a perspective view of an oil preheating system which uses the chemical energy of the hydrogen to heat the engine oil.

FIG. 10 is a schematic view of an oil preheating system 210 in accordance with the present invention which uses the chemical energy of the hydrogen to heat the engine oil. A small tube or pipe 212 may extend from a hydrogen and oxygen source through the oil pan 214, perhaps coiled around the oil pump 216 in the sump of the oil pan, then back out of the oil pan. This small tube 212 is filled with a hydrogen active catalyst, such as platinum coated alumina pellets, which are very effective at combining hydrogen and oxygen to produce heat that is then transferred to the oil. A temperature sensor 218 is installed in the catalyst bed to allow closed As loop control of the hydrogen and oxygen gas flow and, therefore, the catalyst temperature. Alternatively, a parallel plate type heat exchanger could be used so that a source of forced air is not required. The parallel plate(s) would have sufficient open area that ambient air would be drawn over the catalyst surface.

Because the preheater systems of the invention are sufficiently small, compact and simple to allow them to be placed at any number of places on or throughout the engine and associated support equipment. For example, a separate dedicated preheater may be used for the oil entering the turbochargers.

Furthermore, a preheater may be used to heat the fuel before or after the injector pump. Preferably, a fuel preheater would comprise a catalyst tube surrounding or otherwise in thermal contact with the fuel line entering the injector. Because the velocity of the fuel in the fuel lines is quite slow, the preheater is preferably positioned close to, or preferably in direct thermal communication with, the injector so that the fuel will maintain its temperature into the injector. It should be recognized that the preheater of the present invention are compatable with methanol based preheating systems or systems using a combination of heating mechanisms, such as electrical resistance heating, catalytic combination of hydrogen and oxygen, and/or catalytic decomposition of methanol. Methanol may be advantageously used as the main source of fuel after preheating the catalyst with hydrogen. Methanol provides an overall improved system efficiency since the user puts a fuel in the storage reservoir rather than just water.

Hydrogen may also be directly injected into the diesel engine itself. If the pressure of the diesel is below a few hundred PSI before going into the injector pump, it is possible to inject hydrogen into the diesel. The injected hydrogen will be dissolved into the diesel since the fuel is able to contain large concentrations of hydrogen. This hydrogen will then be further compressed and when injected into the cylinder may tend to effervesce (making the diesel break into smaller droplets) or at least improve the properties of combustion since it will improve the flame properties of the ignition.

Figure 11:
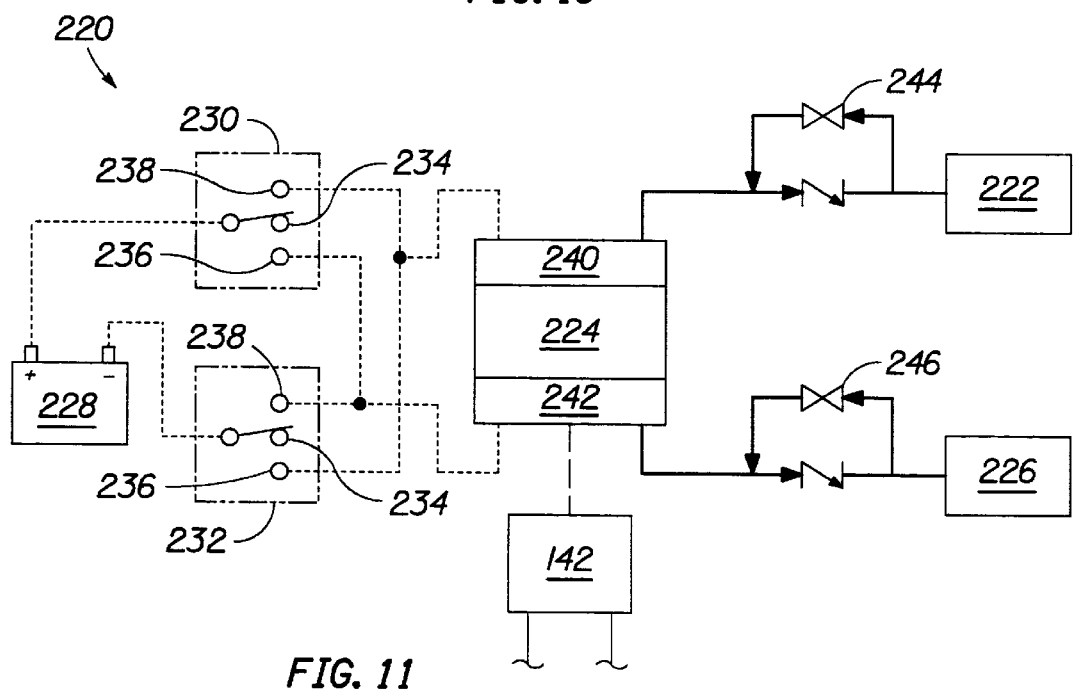
FIG. 11 is a schematic diagram of a system which can be operated either as an electrolyzer or a fuel cell drawing fuel (hydrogen) from a first storage reservoir and an oxidizer (oxygen) from a second storage reservoir.

While chemical energy is being directly converted to heat for both the engine cylinder air and engine oil or fuel pre-heaters, the same chemical energy can be converted to electricity to preheat the battery. This is preferably accomplished using solid state semiconductor switches to electrically connect a fuel cell to the battery. Referring to system 220 of FIG. 11, fuel (hydrogen) is drawn from the storage reservoir 222 on the cathode side of the fuel cell 224 and an oxidizer (oxygen) is drawn from another storage reservoir 226. The hydrogen and oxygen are combined within the fuel cell 224 to produce electricity with a conversion efficiency approaching 50%. As this electrical energy charges the battery 228, it warms the electrolyte (such as sulfuric acid) and other internal components (such as lead plates) of the battery 228. When this charging current is removed, the warm electrolyte and lead plates of the battery allow the chemical reaction (as the plate surface goes to lead sulfate) within the battery to proceed at a rate characteristic of this warmer temperature. While the charging to the battery is not insignificant (typically in the range of 5 to 25 amps), it is the heating that allows all the previously stored energy in the battery to be made available, thereby increasing the "cold" cranking amps of the battery and the ability of the battery to take a charge.

More particularly, two solid state semiconductor switches 230, 232 are provided between the electrolyzer/fuel cell 224 and the positive terminal 231 and negative terminal 233 of the battery 228, respectively. The switches 230,232 may have three positions or conditions, namely off 234, electrolyze 236 and charge 238. In the electrolyze mode of operation, the switch 230 connects the positive battery terminal to the electrode 242 and the switch 232 connects the negative battery terminal to the electrode 240. Providing a source of water to the electrode 242 allows the cell 224 to produce oxygen at electrode 242 for storage in vessel 226 and hydrogen at electrode 240 for storage in vessel 222. In the battery charge or preheat mode of operation, the switch 230 connects the positive battery terminal to the electrode 240 and the switch 232 connects the negative battery terminal to the electrode 242. In the battery charge mode, valves 244, 246 allow the hydrogen and oxygen from the storage vessels 222,226 to be supplied to the cell 224. The cell 224 then performs as a fuel cell with the hydrogen (fuel) providing a flow of As electrons back through switch 230 to the battery and the oxygen (oxidant) combining with protons and electrons at electrode 242 to form water. Each of the foregoing operations may be controlled by the system controller 142 or some other controller.

After the system has delivered its stored energy to preheat the engine, oil, fuel and/or battery, it monitors the engine temperature and battery charge. When the battery has significantly recharged, the electrolyzer operates as a parasitic electrical load to replace the hydrogen and oxygen gas that was consumed during the previous starting cycle. As these gases are generated, the gases are directed into storage vessels where the pressure increases as the gasses are formed. When a preset pressure is reached, the electrolyzer turns off and the system has stored sufficient chemical energy to preheat the engine, oil, and battery during the next cold start. Since the electrolyzer operates at greater than 80% efficiency, a relatively small power draw from the alternator can easily generate one liter per minute or 10,000 Joules of chemical energy per minute of operation. Total water consumption is very small with 100 grams of water making approximately 125 liters of hydrogen, in turn containing 1.25 million Joules of energy.

While the foregoing is directed to the preferred embodiment of the present invention, other and further embodiments of the invention may be devised without departing from the basic scope thereof. The scope of the invention is determined by the claims which follow.

What is claimed is:

1. An internal combustion engine comprising:

a catalyst disposed across the main air intake passageway; and a source of hydrogen in fluid communication with the catalyst.

2. The engine of claim 1, further including a temperature sensor in thermal communication with the catalyst.

3. The engine of claim 2, further comprising:
   a valve disposed in fluid communication between the source of hydrogen and the catalyst; and
   a controller capable of sending an analog signal to the valve to control the release rate of the hydrogen to follow any arbitrary waveform.

4. The engine of claim 2, further comprising:
   a valve disposed in fluid communication between the source of hydrogen and the catalyst; and
   a controller capable of sending an analog signal to the valve to control the release rate of the hydrogen to follow a calculated value, a look-up table value, or any other output which is the result of various input parameters to the controller.

5. The engine of claim 1, further including a temperature sensor disposed in the air intake passageway downstream of the catalyst.

6. The engine of claim 1, further including a temperature sensor for measuring the engine temperature.

7. The engine of claim 1, further including a valve disposed between the hydrogen source and the air intake passageway for controlling the introduction of hydrogen into the passageway.

8. The engine of claim 1, wherein the air intake passageway has an internal wall and the catalyst is disposed on the internal wall.

9. The engine of claim 1, further comprising one or more monoliths disposed within the passageway, wherein at least a portion of the catalyst is disposed on the one or more monoliths.

10. The engine of claim 9, wherein the monolith comprises a substrate selected from ceramic or metal.

11. The engine of claim 9, wherein the one or more monoliths is a plurality of monoliths, and further comprising a plurality of temperature sensors in thermal communication with the plurality of monoliths.

12. The engine of claim 1, wherein the catalyst comprises at least one catalyst selected from noble metals, noble metal alloys, or combinations thereof.

13. The engine of claim 12, wherein the noble metal catalyst is selected from platinum, palladium rhodium, iridium, alloys of these elements, alloys containing at least one noble metal and one or more transition elements, and mixtures thereof, wherein the one or more transition elements are selected from first, second or third row transition elements.

14. The engine of claim 1, wherein the air intake comprises a passageway and at least a portion of the catalyst is provided on a monolith that is disposed within the passageway.

15. The internal combustion engine of claim 1, wherein the air intake passageway is a combustion air intake passageway.

16. The internal combustion engine of claim 1, wherein the air intake passageway provides air to an intake manifold of the internal combustion engine.

17. The internal combustion engine of claim 1, wherein the air intake passageway flows air into the engine cylinders.

18. The engine of claim 1, wherein the catalyst is a hydrogen oxidation catalyst.

19. The engine of claim 2, further comprising a source of oxygen in communication with the catalyst.

20. An air intake line for an internal combustion engine, comprising:
    a catalyst disposed across the main air intake line; and
    a hydrogen delivery conduit having a valve for communicating a source of hydrogen to the catalyst region of the main air intake line.

21. The air intake line of claim 20, further comprising a source of oxygen in communication with the air intake line.

22. The air intake line of claim 20, wherein the air intake line has a first end in communication with the internal combustion engine and a second end in communication with a source of oxygen.

23. The air intake line of claim 20, wherein oxygen and hydrogen are provided to the catalyst for catalytic combination.

24. The air intake line of claim 20, wherein the air intake line provides excess oxygen to the catalyst.

25. The air intake line of claim 20, wherein the excess oxygen and byproducts of the catalytic combination are directed into the internal combustion engine.

26. The air intake line of claim 20, wherein the internal combustion engine is a compression ignition engine.

27. The air intake line of claim 20, wherein the internal combustion engine is a spark ignition engine.

28. The air intake line of claim 20, wherein the air intake line provides excess hydrogen to the catalyst.

29. The air intake line of claim 20, wherein the air intake line is a supplemental air intake line.

30. The air intake line of claim 29, wherein the supplemental air intake line provides air to a fuel injector.

31. A method of providing warm air to an internal combustion engine having an air intake line, comprising:
    disposing a hydrogen oxidation catalyst in the main air intake line;
    passing air through the main air intake line to the hydrogen oxidation catalyst and into the internal combustion engine;
    providing hydrogen to the catalyst during cold startup of the internal combustion engine;
    catalytically combining the hydrogen and oxygen in the air on the catalyst to heat the catalyst; and
    transferring heat from the catalyst to the air passing into the internal combustion engine.

32. In a system for mixing hydrogen with oxygen from an oxygen conduit, an apparatus comprising:
    a hydrogen destruction catalyst bed disposed in the oxygen conduit to prevent passage of hydrogen through the oxygen conduit, the hydrogen destruction catalyst bed being suitable to catalytically combine the hydrogen with oxygen at ambient temperatures.

33. The apparatus of claim 32, wherein the oxygen conduit is an exhaust pipe having a catalytic converter and a hydrogen injection port in fluid communication with the catalytic converter, and wherein the hydrogen destruction catalyst bed is disposed in the exhaust pipe upstream from the hydrogen injection port.

34. The apparatus of claim 32, wherein the oxygen conduit is an air intake line to an internal combustion engine, the air intake line comprising a second catalyst bed and a hydrogen injection port in fluid communication with the second catalyst bed, wherein the hydrogen destruction catalyst bed is disposed upstream of the hydrogen injection port.

35. The apparatus of claim 34, wherein the hydrogen destruction catalyst bed is disposed in an air intake manifold.

36. An internal combustion engine comprising:
    a catalyst disposed in the air intake line providing air to the intake manifold of the engine; and
    a conduit for communicating a source of hydrogen with the catalyst.

* * * * *